United States Patent [19]

Davis

[11] 4,248,919

[45] Feb. 3, 1981

[54] BUSINESS FORM

[75] Inventor: Ronald A. Davis, Blue Island, Ill.

[73] Assignee: Litton Business Systems, Inc., Belleville, N.J.

[21] Appl. No.: 33,535

[22] Filed: Apr. 26, 1979

[51] Int. Cl.[2] .......................... B32B 7/10; B41L 1/04; G09F 19/00

[52] U.S. Cl. ....................................... 428/40; 40/2 R; 40/615; 282/8 A; 282/27.5; 282/28 R; 282/28 A; 428/58; 428/914

[58] Field of Search ................. 40/615, 2 R; 156/247, 156/249, 289, 277; 235/488; 282/8 A, 28 R, 28 A, 27.5; 346/135; 428/40, 41, 57, 58, 68, 76, 916, 914

[56] References Cited

U.S. PATENT DOCUMENTS

| | | | |
|---|---|---|---|
| 2,507,659 | 5/1950 | Zalkind | 428/40 X |
| 2,725,322 | 11/1955 | Muttera | 428/41 |
| 3,383,121 | 5/1968 | Singer | 428/41 X |
| 3,501,797 | 3/1970 | Nappi | 428/40 X |
| 3,505,140 | 4/1970 | Dunn | 264/338 X |
| 3,582,439 | 6/1971 | Thomas | 428/40 X |
| 3,664,910 | 5/1972 | Mollie | 428/192 X |
| 3,973,788 | 8/1976 | Pekko et al. | 282/28 R |
| 4,029,341 | 6/1977 | Neill et al. | 282/28 R |

*Primary Examiner*—Bruce H. Hess

*Attorney, Agent, or Firm*—Norman Friedman; Robert F. Rotella

[57] ABSTRACT

A business form, which may be a tag, label, ticket, identification card, or the like, comprising a base sheet adapted to receive writing or printing and a transparent sheet having adhesive by which it can be laminated to the base sheet, and a liner sheet covering the adhesive. A removable carbon paper or other sheet lying between the liner and base sheets is secured to the former whereby removal of the carbon sheet automatically causes the liner sheet to be pulled off and removed and the transparent sheet to be applied to the face of the base sheet.

13 Claims, 8 Drawing Figures

FIG. 1
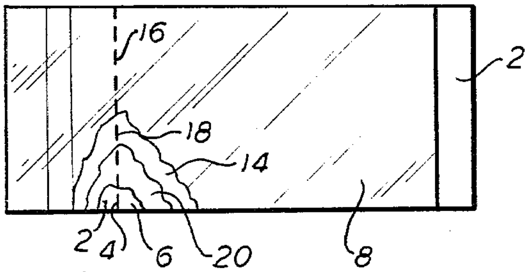
FIG. 6
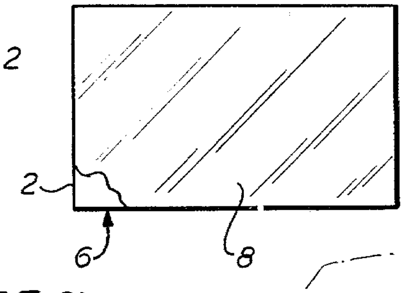
FIG. 2
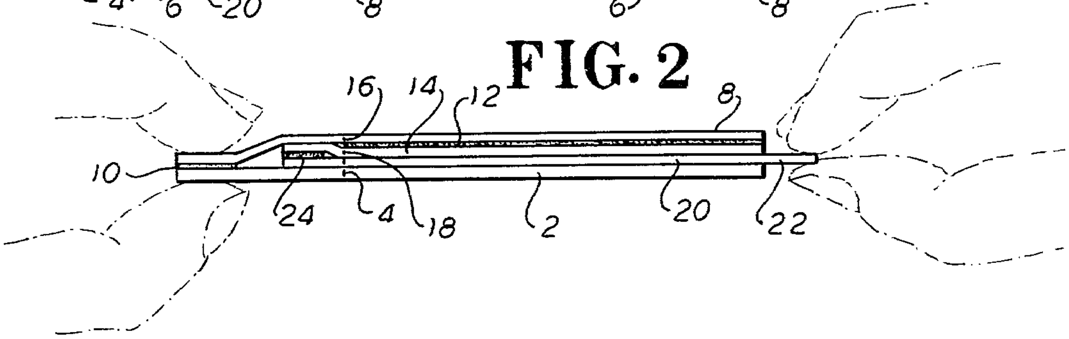
FIG. 4
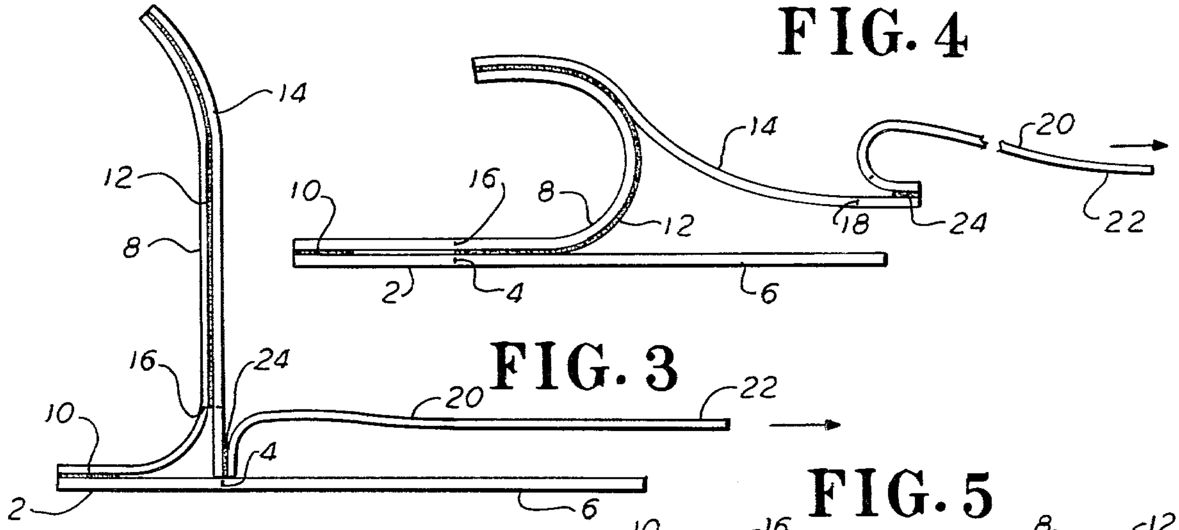
FIG. 3
FIG. 5
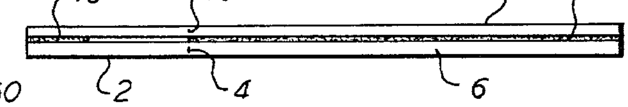
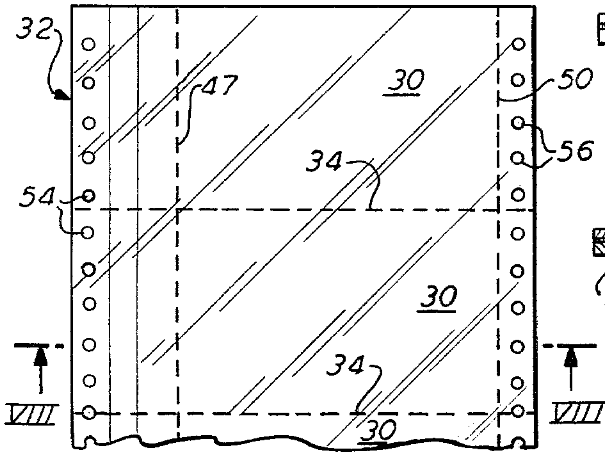
FIG. 7
FIG. 8
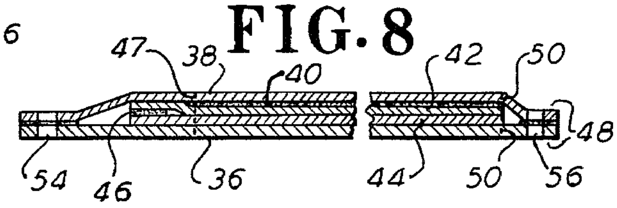

BUSINESS FORM

BACKGROUND OF THE INVENTION

1. Field of the Invention

This invention relates to business forms and the like, and may be employed in any one of a wide variety of such forms, tags, labels, tickets, identification cards, and the like being merely some examples of these.

2. Description of the Prior Art

It is known to provide in such business forms a base sheet or layer, usually adapted to have information printed or written thereon; a transparent protective sheet having an adhesive coating by which it may be secured to base layer; a liner sheet covering the adhesive prior to use; and a carbon sheet or the like overlying the base sheet, whereby information may be written or printed on the base sheet by applying writing or printing pressure to the outermost face of the transparent protective layer.

In use, after the desired information is applied to the base layer, the carbon sheet is removed and then the liner strip on the adhesive layer of the transparent protective sheet must also be removed. Following this, the latter can now be pressed down onto the base layer to laminate the two together.

Other examples of prior art devices are disclosed in the following U.S. Pat. Nos. 2,507,659; 2,725,322; 3,501,797; 3,505,140; 3,526,567; 3,582,439; 3,664,910; 3,874,979.

SUMMARY OF THE INVENTION

In accordance with the present invention, the carbon or other sheet lying adjacent the liner strip or sheet is secured to the latter, so that when the former sheet is removed by being pulled out, it will automatically remove the liner strip with it. Furthermore, this pulling-out removal operation of the carbon sheet, which causes the liner strip to be automatically removed with it, will in turn automatically "roll" the transparent sheet, with its adhesive now exposed, down across the face of the base sheet to laminate the latter two sheets together.

This automatic one-step removal of the carbon and liner sheets has several distinct advantages. It reduces the number of steps the user must perform to create the final document. In the prior art devices, after removing the carbon sheet the user then had to reach in to grasp the innermost end of the liner strip to pull it off. This could be cumbersome and difficult to do, especially if the user were wearing gloves. Also, if the user's hands or gloves were dirty, the almost unavoidable contact with the now-exposed adhesive would transfer the dirt to the latter, impairing the transparency and adhesiveness of the transparent sheet.

Furthermore, in the prior art devices the final step of applying the transparent sheet to the base sheet had to be done extremely carefully or else there resulted misalignment of the two layers and/or wrinkling of the transparent sheet. The present invention avoids these problems by a one-step removal of the carbon and liner sheets. This in turn causes the automatic and simple application of the transparent sheet to the base sheet in proper alignment with each other and with a minimum possibility of wrinkling.

It is therefore a primary object of the invention to provide an improved business form.

It is a further object to provide such a business form wherein removal of a liner sheet covering an adhesive layer is automatically effected in response to and by removal of another sheet adjacent the liner sheet.

It is a further object to provide such a business form in which an adhesive protective sheet is adapted to be laminated to another sheet by the user, in proper alignment and with a minimum likelihood of wrinkling of the protective sheet.

It is a further object to provide a form of the foregoing type which is easier to use than prior art devices.

It is a further object to provide a form of the foregoing type which can be readily manufactured on present commercially available manufacturing equipment.

The above and other objects, advantages, and features of the invention will become apparent to those skilled in the art from the following detailed description of specific embodiments of the invention when read in conjunction with the accompanying drawings, in which:

BRIEF DESCRIPTION OF THE DRAWINGS

FIG. 1 is a top plan view of a first embodiment of a business form of the invention.

FIGS. 2, 3, 4, and 5 are front elevational views shows successive steps in how the form is manipulated to create the final document.

FIG. 6 is a top plan view of the final document.

FIG. 7 is a top plan view of a second embodiment of the invention. Here, the form is provided in a continuous form pin feed arrangement suitable for use in automatic data processing equipment.

FIG. 8 is a transverse sectional view taken on line VIII—VIII of FIG. 7.

DETAILED DESCRIPTION OF SPECIFIC EMBODIMENTS

Referring now to FIGS. 1–6 of the drawing, reference numeral 2 designates a first, lowermost base layer or sheet, which may be adapted to receive on its uppermost face printing or writing. At its left side, sheet 2 is provided with a line of weakening 4, comprising spaced slits or cuts, along which the sheet can be torn or cut to provide a final document 6 (FIGS. 1, 6). Document 6 comprises the portion of sheet 2 lying to the right of tear line 4. Sheet 2 may be of any suitable material and thickness depending upon what document 6 is to be used for, e.g., an I.D. card, a label, a tag, etc. Sheet 2 will normally be a suitable paper stock.

An uppermost transparent protective sheet 8 for base sheet 2 is substantially coextensive in outer dimensions with sheet 2. Sheet 8 may be Mylar, acetate, or the like, about 0.001 inches thick. Sheets 2 and 8 are secured together adjacent their left hand side edges by a narrow adhesive band 10 which extends across the full width of the form from top to bottom. Protective transparent sheet 8 is adapted to be adhesively laminated or secured to the upper face of the base, document sheet 2. For this purpose, sheet 8 is provided with a coating 12 of any suitable permanent type pressure sensitive adhesive, which may for example be an acrylic base adhesive. Releasably secured to the adhesive layer 12 is a conventional liner sheet or strip 14 therefor. It comprises for example a paper layer having on the face thereof nearest the adhesive a silicone coating whereby the liner can be easily stripped away from the adhesive.

Transparent sheet 8 and liner sheet 14 are each provided with respective tear lines of weakening 16 and 18 identical with and vertically aligned with tear line 4. The adhesive coating 12 on transparent sheet 8 completely covers the latter from its rightmost end to tear line 16. Between tear line 16 and the rightmost edge of adhesive band 10, transparent sheet 8 is free of adhesive.

Interposed between the liner strip 14 and the document base sheet 2 is a sheet 20 of carbon paper. The carbon layer of sheet 20 faces the document sheet 2. Thus, writing or printing can be effected on the upper face of sheet 2 by applying suitable writing or printing pressure to the outermost, upper face of transparent protective sheet 8.

Carbon sheet 20 is unconnected to the base sheet 2, and after use is removed, by pulling it to the right as seen in FIGS. 2, 3, and 4. To facilitate grasping carbon sheet 20 it is made sufficiently long that it extends outwardly to the right beyond the other sheets of the assemblage to provide an easily accessible manually graspable tab-like portion 22.

At their extreme left hand edge portions, the carbon sheet 20 and the liner sheet 14 are secured together by a narrow band of adhesive 24 so that the act of removing the carbon sheet will in turn pull out and remove the liner sheet. Band 24 extends across the full width of the form from top to bottom.

How the form is used is best seen in FIGS. 2–5. Information is first applied to the document portion 6 of base sheet 2 via carbon sheet 20 by applying writing or printing pressure to the outside face of the transparent sheet 8. With one hand holding the left hand end of the form (FIG. 2), the user grasps the tab-like portion 22 of carbon sheet 20 and pulls it to the right to remove the carbon sheet from the assemblage. This movement of the carbon sheet is transmitted to the adjacent left hand edge portion of the liner strip 14 to which the carbon sheet is secured by adhesive band 24.

As seen in FIG. 3, as the movement of the carbon sheet continues to the right it pulls along with it the innermost edge portion of the liner strip 14. This causes the extreme left hand edge of the latter to move along the upper face of base sheet 2 and swing the secured-together left hand edge portions of sheets 14 and 20 to a position perpendicular to the face of base sheet 2. This will cause transparent sheet 8, to which liner sheet 14 is lightly adhered, together with sheet 8 to extend upwardly and roll over to the left. The continued pulling movement of the carbon sheet 20 to the right (FIG. 4) will pull the liner sheet 14 off the adhesive coating 12 of transparent sheet 8, in the course of which the continuous light adhesive forces between the adhesive layer 12 and the liner sheet will pull the transparent sheet 8 to the right to cause it to roll down onto and be laminated to the upper face of base sheet 2 in proper superimposed alignment therewith and without any wrinkling of the transparent sheet. This pulling movement of the carbon sheet 20 to the right is continued by the user until the liner sheet 14 is completely removed from the adhesive layer 12 of the transparent sheet 8. At this point the latter will now be fully laminated to, i.e., adhesively superimposed upon, the base layer 2. The form is now in the condition shown in FIG. 5. If desired, the user can now manually apply some additional pressure to the base layer-transparent sheet laminate to insure that the two are extremely firmly adhesively bonded together. The document portion 6 and the protective transparent sheet 8 laminated thereto are then torn off or cut along their aligned tear lines 4 and 16 to produce the final laminated document shown in FIG. 6.

It should be noted that the tear line 18 in liner sheet 14 is not necessary, since this sheet is not torn off. However, in the manufacturing process it is more convenient and economical to produce the tear lines in the entire superposed assemblage of sheets. This results in the vertically aligned tear lines being provided in all the sheets or layers, including carbon sheet 20.

FIGS. 7 and 8 show another embodiment of the invention. Here, the forms are arranged in a continuous form pin feed arrangement adapted for use in automatic data processing apparatus. For this purpose, the forms 30 are provided as an elongated web 32 from which they are adapted to be individually removed by bursting or tearing along burst lines 34. The latter comprise conventional lines of spaced slits. Each form 30 is constructed substantially as described above in connection with the embodiment of FIGS. 1–6. That is to say, it comprises a lowermost base sheet 36 to be printed on; an uppermost transparent sheet 38 adapted to be laminated to the former by being provided with a pressure sensitive adhesive layer 40; a liner sheet 42 for the adhesive layer 40; and a carbon paper sheet 44 between the liner sheet 42 and the base sheet 36. The carbon sheet 44 and liner sheet 42 are connected together by an adhesive band 46 so that, as above, removal of the carbon sheet will cause automatic removal of the liner sheet. Vertically aligned lines of weakening 47 are provided as in the first embodiment.

In the FIGS. 7–8 embodiment the structure at its right hand edge portion differs from the FIGS. 1–6 embodiment as follows. The base sheet 36 and the adhesive coated uppermost transparent sheet 38 extend a short distance to the right of the aligned right hand edges of liner sheet 42 and carbon sheet 44. The sheets 36 and 38 are secured together here at these right hand portions, designated 48 in FIGS. 7 and 8; by the adhesive 40 of sheet 38. Just to the left of this secured-together area 48, sheets 36 and 38 are provided with vertically aligned respective tear lines of weakening 50 in the form of spaced slits. The continuous form is provided along its opposed side edge portions with rows of pin feed holes 54, 56. The right hand row of holes 56 is provided in the secured-together portion 48 of the base and transparent sheets 36 and 38. The pin feed holes enable the continuous form to be fed through the suitable automatic equipment such as data processing equipment. In such data processing equipment, printing mechanism can print on the base sheet 36 through carbon sheet 44 by impacting the topmost, transparent sheet 38. The areas to be printed on in base sheet 36 is defined between the left and right tear lines 47, 50.

After the forms of FIGS. 7 and 8 are printed on they are used as follows. Each individual form assemblage 30 is burst or otherwise removed from the web 32 along the burst line 34. Then, at the desired time, the form is cut or torn transversely along the right hand lines of weakening 50 to remove the narrow, secured-together portion 48 of the form lying to the right thereof. The right hand edge portion of the form assembly may now be spread apart for manual access and then manipulated in exactly the same manner as described in connection with the embodiment of FIGS. 1–6. That is to say, the carbon sheet 44 is pulled out, thereby pulling with it the liner strip 42 and causing the transparent outermost layer 38 to be adhesively laminated to the base sheet 36. Following this, the laminated document can be torn off along the left hand line of weakening to provide the final completed document, the same as shown in FIG. 6.

There have been shown and described in the preceding specification two presently preferred embodiments of the invention. However, it will be appreciated that in practice numerous changes, modifications, and improvements can be made without departing from the basic principles of the present invention. For example, instead of the carbon sheet 20 or 44 there could be used instead the well-known type of substitute therefor sometimes known as "no carbon required" paper. Here the opposed confronting surfaces of the base sheet and the adjacent sheet are provided with coatings of materials which will interact when pressure is applied thereto to cause a visible image to be produced on the base sheet. As a further alternative instead of the carbon sheet there could be used merely a sheet of ordinary bond paper or other material. In such an arrangement, for example, any desired information could be written or otherwise applied directly to the face of base sheet 2 or 36. The sheet of plain paper or other material would then be employed to strip away the liner sheet and cause the transparent sheet to be laminated to the base sheet, the same as described herein in connection with the carbon sheet.

Numerous other modifications can be made. It should therefore be understood that the various principles and features of the invention, as defined in the following claims, are susceptible of numerous modifications and of applications in many contexts and evironments other than the specific embodiments disclosed herein. Accordingly, it should be further understood that the foregoing disclosure of specific embodiments of the invention is intended to be illustrative and exemplary only, and in no way limitative of the following claims.

I claim:

1. A business form comprising an assemblage of superposed sheets including:

a first sheet;

a second sheet overlying said first sheet;

said second sheet being provided with pressure sensitive adhesive means for securing said second sheet to said first sheet;

a liner sheet for and releasably secured to said adhesive means;

a third sheet interposed between said liner sheet and said first sheet and adapted to be removed from said assemblage;

said third sheet and said liner sheet being secured together at a given area and unsecured together at another area, so that said third sheet can be grasped independently of said liner sheet and removed from said assemblage, such removal of said third sheet from said assemblage causing consequent removal therewith of said liner and sheet secured thereto; and wherein during said removal of the third sheet and said consequent removal of the liner sheet therewith, said liner sheet is stripped from said adhesive means and in the course of said stripping causes said second sheet to be laid down on said first sheet.

2. The business form according to claim 1, wherein: said second sheet is substantially transparent.

3. The business form according to claim 1, wherein: said given area where said third and liner sheets are secured together comprises solely an area adjacent one side edge of said form.

4. The business form according to claim 1, wherein: said first and second sheets are secured to one another adjacent said one side edge of said form.

5. The business form according to claim 4, wherein: said second sheet is substantially transparent.

6. The business form according to claim 5, including: pressure responsive marking means for marking information on said first sheet;

said marking means including said third sheet.

7. The business form according to claim 6, wherein: said third sheet is a carbon sheet.

8. The business form according to claim 4, wherein: said first and second sheets are unsecured to one another along an opposed side edge of said form.

9. The business form according to claim 8, wherein: a portion of said third sheet extends outwardly beyond said first and second sheets along said opposed side edge of said form, said outwardly extending portion of said third sheet thereby providing an easily accessible manually graspable part.

10. The business form according to claim 4, wherein: said first and second sheets are secured to one another along an opposed side edge of said form.

11. The business form according to claim 1, including:

pressure responsive marking means for marking information on said first sheet;

said marking means including said third sheet.

12. The business form according to claim 11, wherein: said third sheet is a carbon sheet.

13. The business form according to claim 11, wherein: said third sheet and said liner sheet being secured together at said given area by a layer of adhesive between said sheets.

* * * * *